April 16, 1968 J. G. CHRISTIE 3,378,090
HAM PUMPING SCALE
Filed Sept. 27, 1965 2 Sheets-Sheet 2
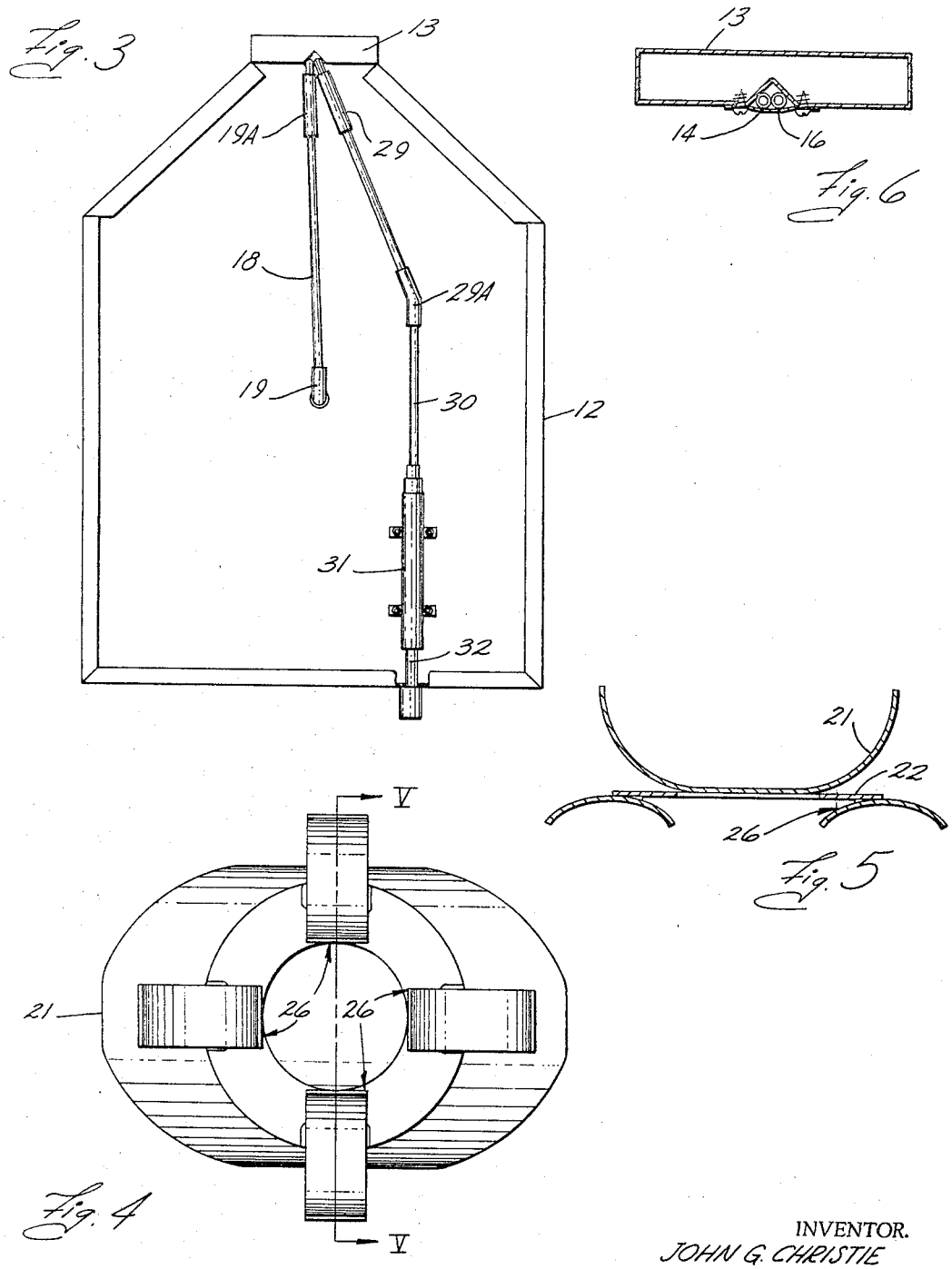
INVENTOR.
JOHN G. CHRISTIE
BY
ATTORNEYS United States Patent Office 3,378,090
Patented Apr. 16, 1968

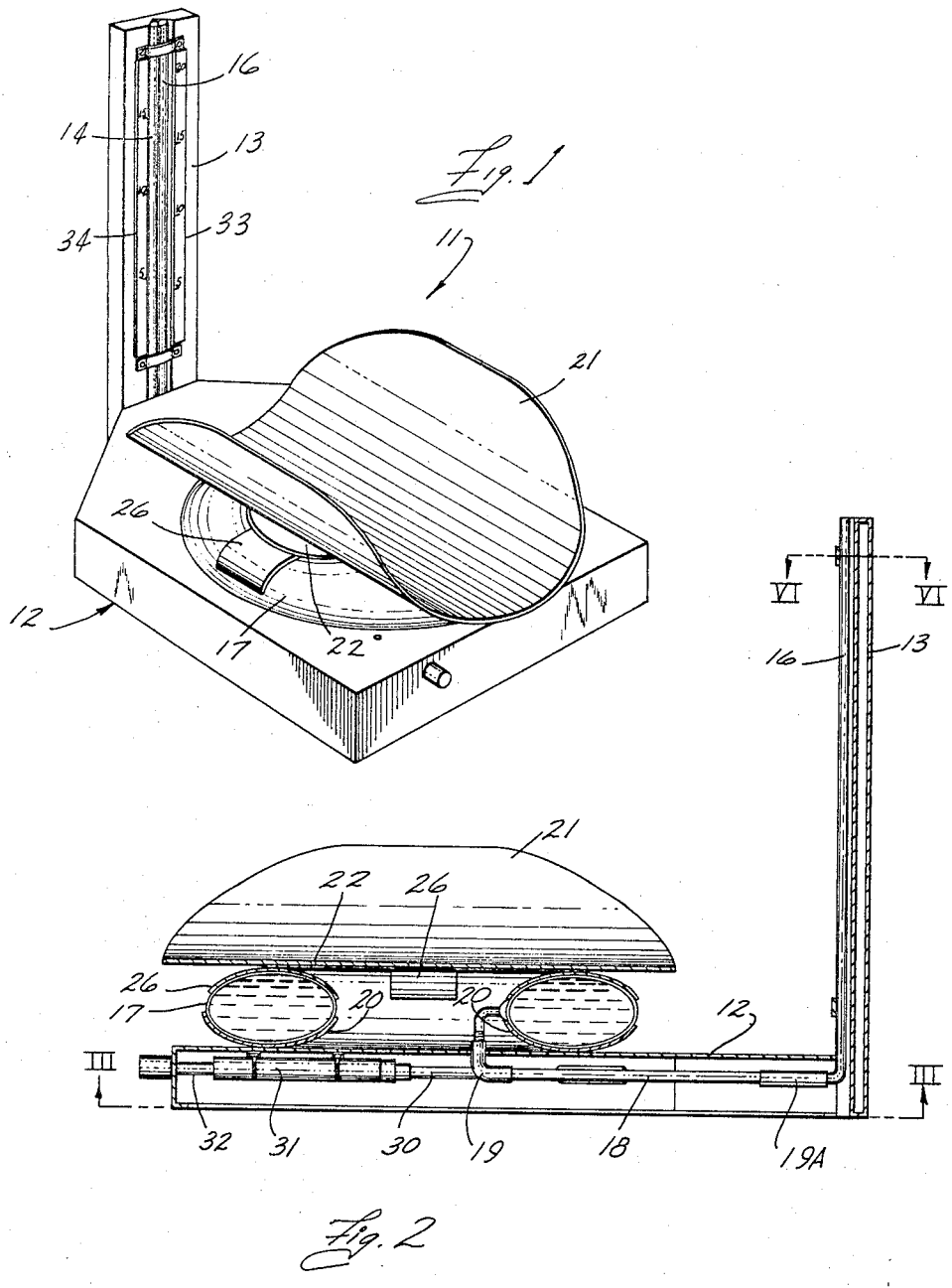

3,378,090
HAM PUMPING SCALE
John G. Christie, 2617 Winchell Ave.,
Kalamazoo, Mich. 49001
Filed Sept. 27, 1965, Ser. No. 490,290
3 Claims. (Cl. 177—164)

This invention relates to an improved weighing scale construction and, more particularly, relates to an improved weighing scale adapted for indicating the amount of curing pickle which has been injected into meat, such as a ham.

A conventional procedure for curing meat, for example, a ham, involves injecting a curing fluid, commonly referred to as "pickle," into the meat. The amount of curing fluid which is injected into the meat must bear a definite relationship to the weight of the individual piece of meat before the pickle is added. This relationship is generally expressed in terms of a percentage of the net weight of the meat. The value of this percentage may vary between wide limits, depending upon the characteristics desired in the finished cured product. For example, in curing hams, a range of from about 10%–25% by weight of pickle is used. The amount of pickle used is relatively critical in determining the characteristics of the type of meat product produced and, hence, the amount of pickle added should be controlled within about 1/2% by weight in order to insure uniformity of the products.

Since the weights of the individual hams vary quite appreciably, each ham must be weighed individually to determine the amount of pickle that should be added thereto. The determination of the proper amount of pickle to be added based on the weight of the ham and the weight percentage of pickle to be added can be carried out by consulting various types of charts, but this type of procedure provides many opportunities for human error and, hence, is less satisfactory than is desired.

Many meat packing establishments, particularly those of larger size, use automatic proportioning-type scales for automatically measuring the amount of pickle to be added to the ham. In the use of such apparatus, the ham is placed on the scale and the pickle is injected thereinto until a suitable signalling device is actuated to indicate that the proper amount of pickle has been added to the particular ham involved. These prior proportioning scale arrangements are relatively expensive and complex and, consequently, many of the smaller meat packers do not use same but rather rely on the less precise manual methods referred to above. Hence, there exists a need for a relatively simple and inexpensive scale arrangement for weighing meat products, such as hams, and indicating the amount of pickle which has been injected into such products.

Scales intended for use with pickle must be completely corrosion resistant if they are to be dependable. In the prior scales, the numerous knife edges, fulcrums, pivots and adjusting devices were made of expensive corrosion resistant metals which are relatively difficult to machine. The scale according to the present invention as hereinafter further described has no machine moving parts and it does not require any difficult adjustments.

Accordingly, it is an object of this invention to provide an improved and simplified scale construction especially adapted for weighing hams and indicating the amount of curing pickle which has ben injected thereinto.

It is a further object of this invention to provide a scale construction in which the weighing platform is supported on hydraulic cushion means and the hydraulic fluid displaced from the cushion means is used to indicate the weight of the ham on the platform.

It is a further object of this invention to provide an improved cradle and hydraulic cushion structure for a scale, as aforesaid.

It is a further object of this invention to provide a scale construction which is inexpensive to manufacture, which is of simple and durable construction and which is easy to operate.

Other objects and advantages of the invention will become apparent to persons acquainted with equipment of this type upon reading the following description and inspecting the accompanying drawings, in which:

FIGURE 1 is a perspective view of the improved scale construction to which this invention relates.

FIGURE 2 is a central sectional view of the scale construction.

FIGURE 3 is a view taken along the line III—III of FIGURE 2.

FIGURE 4 is a bottom view of the cradle.

FIGURE 5 is a sectional view taken along the line V—V of FIGURE 4.

FIGURE 6 is a sectional view taken along the line VI—VI of FIGURE 2.

Referring to the drawings, the scale construction 11 comprises a base 12 and an upstanding support 13 at one end of said base. A pair of upright tubes 14 and 16, which are vented at their upper ends, are secured to the support 13 for purposes to be described hereinafter. A hydraulic cushion, here an annular, hollow, flexible tube 17, of oval cross section, is mounted on the upper surface of the base 12. The tube 17 is substantially filled with a suitable substantially noncompressible liquid, such as water, which may be colored. A plurality, here four, of upwardly opening arcuate saddles 20 are secured to the upper side of the base 12 and are arranged for holding the tube in position thereon. A conduit 18 mounted on the underside of the base 12 is connected by suitable couplings 19 and 19A to the flexible tube 17 and the upright tube 16. Thus, when the flexible tube 17 is compressed, the liquid therein is forced therefrom and it flows directly into the tube 16 and rises therein. The height to which the liquid rises in the tube 16 will provide an indication of the weight applied to the flexible tube 17.

The object to be weighed must be properly located on the tube 17 in order to insure accurate measurement of its weight. For this purpose, there is provided a somewhat channel-shaped trough or a cradle 21 for receiving the object to be weighed. A flat ring 22 is affixed to the underside of the cradle 21, as by welding. The ring 22 lies within a horizontal plate which is substantially tangent to the lowermost point on the trough 21. Four saddle members 26 are secured, as by welding, to the lower side of the ring 22 for extending over the upper side of the tube 17 at equally circumferentially spaced positions thereon. Both the saddles 20 and saddles 26 conform generally to the radial curvature of the tube 17. This arrangement assures that the weight of the object placed in the trough 21 will be substantially uniformly applied over the entirety of the tube so that uniform results will be achieved. It may be noted in this respect that the shape of the trough 21 is such that the object placed therein tends to move to the center thereof which is substantially coaxial with the tube 17. Further, because the weight of the trough 21 is applied at three or more uniformly spaced points on the upper side of the tube 17, any erratic results caused by off-center location of the object to be weighed will be substantially obviated.

The tube 14 is connected by couplings 29 and 29A and by a conduit 30 to a storage chamber 31 for a suitable fluid, which fluid preferably is colored. The storage chamber 31 is mounted on the underside of the base 12. A manually displaceable piston 32 is movable within the storage chamber 31 in order to displace fluid therefrom into the tube 14. The colored fluid rises within the tube 14 and provides an easily visible indicator for use in conjunction with the fluid level in the tube 16 as further described hereinbelow.

A measuring scale 33 is mounted on the upright support 13 along side the tube 16 and said scale can be graduated in terms of the weight of the object placed on the cradle 21. A further measuring scale 34 can be removably attached to the support 13 adjacent the other tube 14. This scale 34 can be graduated in similar terms as the scale 33 except that the scale thereof is expanded, that is the space between indicia on scale 34 will be equal to the space between corresponding indicia on scale 33 multiplied by a factor equal to 1 plus the weight percentage of the curing agent to be added to the ham. Inasmuch as different weight percentages of the curing agent may be added to hams, a separate scale 34 will be provided for each of the different desired weight percentages which might be used.

For example, if a 10 pound ham is to have 15% by weight of pickle added, the final weight of the ham will be 11.5 pounds, while a 20 pound ham treated in a similar fashion will have a final weight thereof of 23 pounds. By using an expanded scale on the measuring scale 34, said scale 34 can be graduated in the same terms as the scale 33. Thus, when a ham is placed on the cradle, the liquid in tube 16 will move upwardly until it indicates the weight of the ham, for example 15 pounds, on the scale 33, then the piston 32 is moved within the storage chamber 31 to displace colored fluid therefrom until the colored fluid rises to a level marked 15 on the scale 34. Because of the expanded scale, the level marked 15 on scale 34 will be above the level marked 15 on the scale 33 by an amount corresponding to the weight of the pickle to be added. This will indicate the level to which the fluid in the tube 14 should rise before injection of the curing pickle is stopped.

While the use of the expanded scale on measuring scale 34 is desirable in order to minimize computations, it will be apparent that the scale can be set up on the same pattern as the scale 33 in which case the operator will have to calculate the amount of pickle to be added. Further, other types of markers can be used instead of the colored fluid, if desired.

In use, the ham to which the curing pickle is to be added will be placed on the cradle 21 so that it will be substantially centered thereon. The liquid displaced from the tube 17 will rise in the tube 16 and by suitably calibrating the scale 33, and perhaps adjusting the amount of liquid in the tube 17, the level to which the liquid rises in the tube will provide an indication of the weight of the ham. Then, the piston 32 is moved within the storage chamber 31 to displace fluid therefrom until the fluid in the tube 14 rises to the same figure designation as appears in tube 16. Due to the expanded scale of the measuring scale 34, the liquid in the tube 14 will rise to a higher level and the difference between the levels in the two tubes will indicate the weight of the curing pickle to be added. Then the operator can place suitable needles into the ham and can inject the curing pickle thereinto until the level of the liquid in tube 16 rises to the same level as the liquid in tube 14 which indicates that the desired amount of pickle has been added to the ham.

It will be apparent that the structure of the invention is quite simple and can be manufactured inexpensively. The only part of the apparatus which is apt to wear out is the tube 17. In order to minimize the cost of repairs, the tube 17 can be made of an innertube of suitable size whereby it can quickly and inexpensively be replaced.

It will further be apparent that in order to change the apparatus so that it can be used for adding a different weight percentage of pickle to hams, all that needs to be done is to replace the scale 34 by a similar measuring scale 34 but which has its scale expanded by an appropriate amount which is a function of the desired amount of pickle to be added to the hams.

While a particular preferred embodiment of the invention has been described, the invention contemplates such changes or modifications therein as lie within the scope of the appended claims.

The embodiments of the invention in which an exclusive property or privilege is claimed are defined as follows:

1. A weighing apparatus, comprising:
   a frame;
   an annular, flexible, hollow bag substantially filled with a liquid and mounted on said frame;
   an elongated upwardly open receptable which is substantially U-shaped in transverse cross section so that objects placed thereon tend to move substantially to the center thereof;
   saddle means secured to the underside of said receptacle, said saddle means being substantially centered on said receptacle and being of downwardly opening substantially U-shaped transverse cross section, the upper portion of the periphery of the bag being received snugly within and contacting said saddle means so that the weight of an object placed on said receptacle is applied through said saddle means substantially uniformly to said bag and so that said saddle means and said receptacle are restrained from lateral movement with respect to said bag;
   an upright tube mounted on said frame and connected to said bag so that the level to which the liquid rises in said tube indicates the weight of the object on the receptacle.

2. A weighing apparatus according to claim 1, in which said frame has a flat upper surface;
   at least three upwardly opening saddles of substantially U-shaped transverse cross section mounted on said upper surface at arcuately spaced positions thereon, the lower portion of the periphery of the bag being received snugly within and contacting said upwardly opening saddles;
   said saddle means on said receptacle comprising a flat ring secured to the underside of said receptacle and extending tangent to the lowest point on said receptacle and at least three downwardly opening saddles secured to the underside of said ring at arcuately spaced positions theron and opening downwardly away from said ring, all of said upwardly opening and downwardly opening saddles being of substantially the same size and shape with the distance between the inner and outer edges of each of said saddles being approximately equal to the distance between the inner and outer circumferences of said bag measured in a radial direction.

3. A weighing apparatus, comprising:
a frame;
a flexible, hollow bag substantially filled with a liquid and mounted on said frame;
a receptacle for receiving the object to be weighed;
means supporting said receptacle on said bag so that the weight of said receptacle and its contents are substantially uniformly applied to said bag;
an upright tube mounted on said frame and connected to said bag so that the level to which the fluid rises in the tube indicates the weight of the object on the receptacle;
a second upright tube mounted on the frame alongside the first-mentioned tube; and
a reservoir for holding a supply of liquid, said reservoir being connected to said second tube and manually operable means for displacing fluid from said reservoir into said second tube.

References Cited

UNITED STATES PATENTS

| | | | |
|---|---|---|---|
| 1,227,503 | 5/1917 | Troll | 177—209 |
| 1,458,920 | 6/1923 | Troll | 177—208 XR |
| 1,639,121 | 8/1927 | Weber | 177—262 XR |
| 2,263,383 | 11/1941 | Griffith | 177—245 |
| 2,303,010 | 11/1942 | Walter | 177—166 XR |
| 2,577,100 | 12/1951 | Alvarez | 177—254 XR |
| 2,954,221 | 9/1960 | Ernst | 177—208 |

FOREIGN PATENTS

| | | |
|---|---|---|
| 104,840 | 8/1938 | Australia. |
| 649,896 | 10/1962 | Canada. |
| 398,687 | 9/1933 | Great Britain. |
| 578,341 | 6/1958 | Italy. |

ROBERT S. WARD, JR., *Primary Examiner.*